United States Patent [19]

Ogata et al.

[11] Patent Number: 5,030,597
[45] Date of Patent: Jul. 9, 1991

[54] PROCESS FOR PRODUCING CERAMIC COMPOSITES

[75] Inventors: Tomohiko Ogata; Takako Mori, both of Otsu; Hiroshi Kuwajima, Shiga, all of Japan

[73] Assignee: Toray Industries, Inc., Tokyo, Japan

[21] Appl. No.: 487,374

[22] Filed: Mar. 2, 1990

[30] Foreign Application Priority Data

Mar. 3, 1989 [JP] Japan .................... 1-52629
Sep. 27, 1989 [JP] Japan .................... 1-256025

[51] Int. Cl.$^5$ ................ C04B 35/56; C04B 35/58
[52] U.S. Cl. ........................... 501/93; 501/96; 501/102
[58] Field of Search ............. 501/93, 95, 96, 102

[56] References Cited

U.S. PATENT DOCUMENTS 3,808,012 4/1974 Bailey et al. .
3,859,399 1/1975 Bailey et al. .
4,514,355 4/1985 Montgomery .
4,910,171 3/1990 Watanabe ..................... 501/87

FOREIGN PATENT DOCUMENTS 47-35011 11/1972 Japan .
49-85115  8/1974 Japan .
58-12057  1/1983 Japan .
58-217463 12/1983 Japan .
59-118828  7/1984 Japan .
60-226459 11/1985 Japan .
61-270265 11/1985 Japan .
62-292678 12/1987 Japan .

*Primary Examiner*—William R. Dixon, Jr.
*Assistant Examiner*—Chris Gallo
*Attorney, Agent, or Firm*—Birch, Stewart, Kolasch & Birch

[57] ABSTRACT

Ceramic powders selected from the group (a) consisting of $ZrB_2$, $HfB_2$, $ZfC$, $ZrN$ and $HfN$ and ceramic powders selected from the group (b) consisting of $TiC$, $TiN$ and $TiO_2$ are mixed, the mixture is sintered in a non-oxidizing atmosphere, a substitution reaction of chemical elements between the compound of the ceramic powders of the group (a) and the compound of the ceramic powders of the group (b) is caused in the sintering, and a ceramic composite substantially comprising compounds which do not belong to the groups (a) and (b) is produced by the substitution reaction. By this process, the affection of the particle size and the aggregation of raw powders to the sintering can be greatly reduced, the ranges of the applicable sintering conditions can be broadened, and dense ceramic composites having fine crystal grains and having excellent mechanical properties can be obtained.

22 Claims, 4 Drawing Sheets

PROCESS FOR PRODUCING CERAMIC COMPOSITES

BACKGROUND OF THE INVENTION

1. Field of the Invention

The present invention relates to a process for producing a ceramic composite suitable for materials in various uses requiring strength and toughness such as a part of an internal combustion engine for automobiles such as a glow plug, a turbine wheel of a turbo charger, a piston cap, a lining of a cylinder, a tappet, an exhaust valve, a hot plug in a sub-combustion chamber of a diesel engine, a part of an aircraft or a spacecraft such as a fan, an air compressor of a jet engine, a housing of a combustion chamber, a heat insulator of a nose cone, a slidable part of a pump, a die, a tool, cutlery, a thread guide, heat resisting pipe, a pipe for a high-temperature gas, a crucible for dissolution, a roll for a rolling mill, etc.

2. Description of the Prior Art

Various processes which are not accompanied with reaction during sintering are known as processes for producing ceramic composites. JP-A-SHO 58-120571 discloses a process for producing $TiB_2$-$ZrO_2$, $TiC$-$ZrO_2$, $TiN$-$ZrO_2$ and $TiCN$-$ZrO_2$ composites containing $TiB_2$, $TiC$, $TiN$ and $TiCN$ as respective main components. JP-A-SHO 47-35011 (corresponding to U.S. Pat. Nos. 3,808,012 and 3,859,399) discloses a process for producing a ceramic composite containing $TiB_2$, $B_4C$, $SiC$ and $Si$. JP-A-SHO 49-85115 discloses a process for producing a ceramic composite containing $TiB_2$ and WC-system cemented carbide. JP-A-SHO 58-217463 and JP-A-SHO 62-292678 disclose processes for producing a ceramic composite containing $TiB_2$ and $Al_2O_3$. JP-A-SHO 59-118828 (corresponding to U.S. Pat. No. 4,514,355) discloses a process for producing a ceramic composite containing $TiB_2$, $BN$ and $Al_2O_3$. JP-A-SHO 60-226459 discloses a process for producing a ceramic composite containing $TiB_2$, $B_4C$ and $TiN$. JP-A-SHO 61-270265 discloses a process for producing a ceramic composite containing $TiB_2$, $TiC$ and $SiC$.

As processes for producing ceramic composites containing $ZrC$, the process disclosed in "Journal of Material Science" (vol. 22, page 1135–1140, 1987) wherein $ZrC$ is combined with $Al_2O_3$ and the process disclosed in "Poroshkovaya Metallurgiya" (vol. 149, page 61–64, 1975) wherein $ZrC$ is combined with $ZrB_2$ are known.

It is common to the conventional processes described above that raw powders (hereinafter also called "starting materials") comprising mixed powders consisting of the same compositions as those of finally obtained ceramic composite are prepared, a desired article is formed with the raw powders and the obtained green article is sintered. In such conventional processes, however, the following problems are present.

First, there is a problem in obtaining obtain a sintered material dense and having fine crystal grains. Because, the particle size of sintered materials generally becomes greater than that of raw powders on account of the growth of crystal grains, the particle size of the raw powders should be as small as possible in order to obtain a sintered material which is dense and has fine crystal grains. In practice, however, it is difficult to obtain raw materials of fine ceramic powders with a commercial base, and particularly non-oxide ceramic powders comprising fine powders having particles of less than a submicrometer size are not available under present circumstances. Accordingly, the particle size of the raw materials which can be industrially applied is limited to an extent, and the densification and fining of obtained sintered materials are also limited. If an obtained sintered material is not dense and if the crystal grains thereof are not sufficiently fine, high mechanical properties thereof cannot be attained.

Moreover, although raw materials of ceramic powders should desirably be as fine as possible, as described above, the raw powders are liable to aggregate and become difficult to disperse as they become finer. Since aggregation of raw powders occurs more or less in the conventional processes, such aggregation causes the segregation of the mixed raw powders, whereby the structure of the obtained sintered material becomes nonuniform and the mechanical properties thereof decreases.

Further, in the conventional processes, fairly high temperature, high pressure and a long processing time are required as sintering conditions in order to make pores as small as possible and obtain a denser sintered material. Accordingly, applicable sintering conditions are limited by the kind, particle size, purity etc. of raw powders, and the sintering conditions are inevitably fairly high temperature, high pressure and long duration. Satisfactory sintering cannot be achieved under the conditions of relatively low temperature, low pressure and short duration in the conventional processes.

Furthermore, particularly in the conventional process wherein metal powders are used as a starting material, there is the following problem. If a part of the metal powders remain in the sintered material without the reaction and without converting to a ceramic (i.e. as they are), not only the sintered material becomes porous because the metal powders remain with segregation, but also the mechanical properties of the sintered material greatly decrease because the segregated portions become origins for the fracture of the material.

Furthermore, as to processes accompanied by reaction during sintering, reaction-sintering process and self-combustion process are known.

The reaction-sintering process is a process wherein, after forming a desired article with raw metal powders by using one of various forming methods, a ceramic such as $Si_3N_4$ and $SiC$ is produced in the article by a special heat treatment. For example, after forming an article with $Si$ powders, the article is nitrified in ammonia or a $N_2$ atmosphere, and $Si_3N_4$ is produced by the following reaction $3Si + 2N_2 \rightarrow Si_3N_4$ which occurs in the nitriding step.

The self-combustion process is a process wherein mixed powders including metal powders which should become a component of a target inorganic compound having a high melting point are ignited, and self propagation of the reaction is performed by utilizing the heat of the reaction, thereby achieving a high composition rate. For example, a mixture of $Ti$ powders and $B$ powders is ignited and the reaction of $Ti + 2B \rightarrow TiB_2$ is performed. This process can be applied not only to the composition of a ceramic consisting of a single compound such as $TiB_2$ or $TiC$ but also to the composition of a ceramic composite such as $TiB_2$-$TiC$ system.

In the reaction-sintering process and the self-combustion process, $Si_3N_4$, $SiC$, $TiB_2$, $TiC$ etc. are produced by a specified solid solution process, so-called "interstitial solid solution", wherein the atoms of N, B or C are intruded into crystalline lattices of $Si$ or $Ti$ which is a metal. Because a large thermal energy is generated by this intrusion, the condition of the sintering, in general, is limited to a specified condition of a fairly high temperature. Accordingly, it is difficult to conduct a desired sintering and obtain a dense sintered material under the condition of a relatively low temperature.

SUMMARY OF THE INVENTION

An object of the present invention is to provide a process for producing ceramic composites which have less dependency on the particle size of the raw material and can obtain dense ceramic composites having fine crystal grains and having excellent mechanical properties produced by sintering at particular reaction conditions different from conventional reactions.

Another object of the present invention is to provide a process for producing ceramic composites which can obtain an extremely uniform structure of a sintered material even if aggregation of its raw powders occurs to a slight extent.

A further object of the present invention is to provide a process for producing ceramic composites which can enlarge the ranges of sintering conditions and achieve a desired sintering even at relatively low temperatures and low pressures and in a relatively short period of time.

A still further object of the present invention is to provide a process for producing ceramic composites which prevents the mechanical properties of an obtained sintered material from greatly decreasing, even if a part of starting materials remains in the sintered material without reacting.

To accomplish the above objects, a process for producing a ceramic composite, according to the present invention, is provided which comprises the steps of:
  mixing at least one kind of ceramic powders selected from ceramic powders each consisting of a compound selected from group (a) and at least one kind of ceramic powders selected from ceramic powders each consisting of a compound selected from group (b),
  (a) $ZrB_2$, $HfB_2$, $ZrC$, $HfC$, $ZrN$, $HfN$,
  (b) $TiC$, $TiN$, $TiO_2$;
  sintering the mixture consists of mixed ceramic powders in a non-oxidizing atmosphere;
  causing a substitution reaction of chemical elements between the compound selected from the group (a) and the compound selected from the group (b) by the sintering; and
  making a ceramic composite substantially comprising compounds which do not belong to the group (a) and the group (b) by the substitution reation.

The process according to the present invention will now be explained in detail.

Mixing process

In the process according to the present invention, first, at least one kind of ceramic powder selected from ceramic powders each consisting of a compound selected from the following group (a) and at least one kind of ceramic powders selected from ceramic powders each consisting of a compound selected from the following group (b) are mixed.
  (a) $ZrB_2$, $HfB_2$, $ZrC$, $HfC$, $ZrN$, $HfN$
  (b) $TiC$, $TiN$, $TiO_2$ In the combination of a compound of group (a) and a compound of group (b), the combination, in which a substitution reaction, described in detail later would not occur because the compounds are stable to each other, i.e. the combinations including a of $ZrC$ and $TiC$, $HfC$ and $TiC$, $HfN$ and $TiN$ or $ZrN$ and $TiN$, are not applicable to the present invention. All of the remaining combinations are available.

The particle size of the ceramic powders of group (a) and group (b) is preferably not greater than 5.0 $\mu$m so that the sintering action accompanied with the substitution reaction for the mixture of the ceramic powders may be conducted more promptly and more uniformly. The range of not greater than 5.0 $\mu$m is a much broader range than that utilized in the conventional aforementioned processes.

The mixing ratio of the ceramic powders consisting of a compound selected from group (a) and the ceramic powders consisting of a compound selected from group (b) is selected from the range of 1:0.2–1:2.0 in mole ratio, although this ratio is varied in accordance with the average particle sizes of the ceramic powders, the presence and addition of a stabilizer described later, the presence and addition of other components, and the conditions of sintering. In the present invention, an equimolar substitution reaction such as for example reactions shown by the following reaction formulas is presumed to occur.

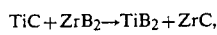
$$TiC + ZrB_2 \rightarrow TiB_2 + ZrC,$$

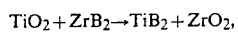
$$TiO_2 + ZrB_2 \rightarrow TiB_2 + ZrO_2,$$

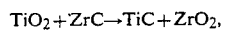
$$TiO_2 + ZrC \rightarrow TiC + ZrO_2,$$

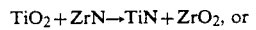
$$TiO_2 + ZrN \rightarrow TiN + ZrO_2, \text{ or}$$

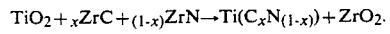
$$TiO_2 + xZrC + (1-x)ZrN \rightarrow Ti(C_xN_{(1-x)}) + ZrO_2.$$

Accordingly, a mole ratio of 1:1 is desirable from a theoretical point of view. Even though unreacted ceramic powders of group (a) and/or group (b) remain in a small amount in the sintered material, it is understood, however that the properties of the sintered material thus obtained is not influenced very much by the presence of residual unreacted ceramic powders powders because the unreacted ceramic are original ceramics in the present invention and the unreacted ceramics can bond with adjacent ceramic by a normal sintering bond. Therefore, the above range of mixing ratios of the ceramic powders of group (a) and group (b) is effective.

The mixing method for ceramic powders of group (a) and group (b) may be any of the dry mixing methods and wet mixing methods. Wet mixing is more desirable from the viewpoint of uniformity of dispersion of the raw powders. For example, an organic solvent such as isopropanol, ethyl alcohol, ethylene glycol or dimethylsulfoxide is added to the mixture of the ceramic powders, and the mixture is sufficiently blended and milled by an attrition mill. By this procedure, secondary aggregation of the misture can be decomposed and primary particles can be quite uniformly dispersed in the mixture. After the mixture is blended and milled, it is dried under reduced pressure by a rotary evaporator. Preferably a rotary evaporator is used because segregation due to gravity difference is liable to occur in natural drying or constant-temperature drying.

In the process according to the present invention, in a case where $ZrO_2$ or $HfO_2$ is contained in the ceramic composite obtained by sintering, crystal structure of the $ZrO_2$ and $HfO_2$ sometimes presents a monoclinic or mainly monoclinic structure. To make this crystal structure tetragonal symmetry, a stabilizer may be added to the mixture of ceramic powders. The stabilizer can be selected from the group consisting of $Y_2O_3$, $CeO_2$, MgO and CaO. The average particle size of the stabilizer is preferably not greater than 0.5 μm. The addition of the stabilizer is controlled to 2-5 mol. % for $Y_2O_3$, 8-16 mol. % for $CeO_2$, 6-12 mol. % for MgO and 3-15 mol. % for CaO as compared with the amount of the $ZrO_2$ and $HfO_2$ produced by substitution reaction. Of course, two or more kinds of stabilizers may be used at a time. For example, 0.5-3 mol. % $Y_2O_3$ and 2.0-14.0 mol. % $CeO_2$, 2.0-10 mol. % MgO and the same mol. % CaO, or 2.0-14.0 mol% $CeO_2$ and 2.0-10.0 mol. % MgO can be used in combination, respectively.

The mixture of the above ceramic powders may contain a so-called third component which is substantially irrelevant to the substitution reaction caused in sintering.

Namely, oxide powders such as $SiO_2$, $Al_2O_3$ or mullite ($Al_6Si_2O_{13}$) or non-oxide powders such as WC, SiC, TiC, ZrC, TiN, ZrN, AlN, $Si_3N_4$ or WB may be added to the mixture according to the property desired of the obtained ceramic composite. If such a third component is added in too, large a quantity, the substitution reaction to be performed is likely to be obstructed because the gaps between the ceramic powders such as TiC or $TiO_2$ and the ceramic powders such as $ZrB_2$, ZrC or ZrN are enlarged by the presence of the third component. Therefore, the addition of this third component is preferably suppressed to not greater than 40 vol. %. The average particle size of the oxide powders such as $SiO_2$, $Al_2O_3$ and mullite is preferably not greater than 0.5 82 m and that of the non-oxide powders such as WC, SiC, TiC, ZrC, TiN, ZrN, AlN, $Si_3N_4$ and WB is preferably not greater than 6.0 μm.

Further, metal powders having an average particle size of not greater than 7.0 μm such as Si, Mg, Ca, Al, Ti, Zr, Hf, Ta, W, Ni, Co, Mo or Fe, metal-oxide powders having an average particle size of not greater than 0.5 μm such as MgO, $Al_2O_3$, $SiO_2$, CaO, $ZrO_2$ or $HfO_2$ or metal-carbide or metal-nitride powders having an average particle size of not greater than 3.0 μm such as B, C, SiC, HfC, TaC, WC, NbC, Cubic BN, $Si_3N_4$, AlN, TiN, ZrN, HfN or TaN can be added as a third component in an amount greater than 40 vol. %, preferably not greater than 20 vol. %. In addition to the metal powders, however, it is necessary to increase the dispersibility of the metal powders to prevent the uneven distribution of the metal powders. Moreover, since metal tends to the plastically deformable and generally not adaptable to the formation of fine powders, the metal is preferably added in the form of a metal hydride such as $TiH_2$ or $ZrH_2$ or in the form of a metal oxalate, metal chloride, metal nitrate or metal alkoxide and such a metal compound is thermally decomposed in the sintering process. In this case, it is also necessary to sufficiently blend the metal-compound powders to prevent their uneven distribution.

In the addition of the third component described above, the addition of ZrN, ZrC, TiN, TiC, HfN or HfC as a third component is restricted to the case wherein these compounds are not used as ceramic powders of group (a) or (b).

Furthermore, whiskers may be added to the mixture of ceramic powders as a third component in the amount of 5-40 vol. %. If whiskers are added, when a crack propagates in the matrix of the ceramic composite thus obtained, the whiskers deflect the crack, the crack branches at the positions of the whiskers and the fracture energy can be absorbed. Moreover, since the fracture energy can be absorbed by the pull-out effect of the whiskers, the fracture strength and the fracture toughness of the ceramic composite increases significantly. Whiskers having such an operation are preferably in the range of 0.2-2.5 μm in diameter, 5-50 μm in length and not less than 10 in aspect ratio. The whiskers are preferably at least one kind of whiskers selected from the group consisting of SiC whiskers, $B_4C$ whiskers and $Si_3N_4$ whisker SiC whiskers are particularly preferably because SiC whiskers are easy to obtain commercially, the Young's modulus and rigidity thereof are higher and the oxidation-resistant property thereof under high temperature is excellent. The addition of the whiskers is preferably in the range of 5-40 vol. %. If the addition is less than 5 vol. %, the increase of the fracture strength and the fracture toughness cannot be expected, and if the addition is more than 40 vol. %, the density of the ceramic composite thus obtained decreases. When whiskers are added, desirably they are preliminarily beforehand sufficiently dispersed in an organic solvent such as ethyl alcohol, toluene or isopropyl alcohol by applying ultrasonic waves etc., using polyethylene imine or trichlorooctadecylsilane etc. as a dispersant.

The third component described above is added in accordance with the desired properties sought to be obtained in the ceramic composite obtained. The third components increasing the density of the ceramic composite are preferably Si, Mg, Ca, Al, Ti, Zr, Hf, Mo, Co, Ni, Fe, W, Ta, $SiO_2$, $HfO_2$, $ZrO_2$, $Al_2O_3$, CaO and MgO.

The third components increasing the strength of the ceramic composite are preferably $ZrO_2$, $Al_2O_3$, $SiO_2$, SiC whisker, $Si_3N_4$ whisker and $B_4C$ whisker.

The third components increasing the toughness of the ceramic composite are preferably $ZrO_2$, $Si_3N_4$, SiC whisker, $Si_3N_4$ whisker and $B_4C$ whisker.

The third components increasing the hardness of the ceramic composite are preferably $B_4C$, cubic BN, SiC, HfC, WC, TaC, NbC, SiC whisker, $Si_3,N_4$ whisker and $B_4C$ whisker.

The third components increasing the thermal conductivity of the ceramic composite are preferably $B_4C$, cubic BN, SiC, HfC, WC, TaC, NbC, ZrN, TiN, HfN, AlN, TaN, SiC whisker, $Si_3N_4$ whisker and $B_4C$ whisker.

The third components increasing the electric conductivity of the ceramic composite are preferably SiC, HfC, WC, TaC, NbC, SiC whisker, $Si_3N_4$ whisker and $B_4C$ whisker.

Sintering process

In the process according to the present invention, the mixture prepared as described above is sintered. There are two methods of sintering. One is a method wherein the mixture is formed as a required shape by cold isostatic pressing, die pressing, slip casting or injection molding and then the shaped mixture is pressure or pressureless sintered. The other is a method wherein the mixture is pressure sintered, i.e. sintered as well as being pressed, by hot pressing, hot isostatic pressing (HIP) etc. without forming the mixture in advance. In any case, the sintering is carried out in a non-oxidizing atmosphere preferably at a temperature of 1000°-1900° C. The non-oxidizing atmosphere in the present invention means an atmosphere which substantially cannot produce an oxide in the atmosphere at the sintering temperature. The preferable atmosphere is an inert atmosphere such as nitrogen gas or argon gas, or a reducing atmosphere such as carbon monoxide gas or hydrogen gas. Argon gas is more preferable in these gases because the content of oxygen can be reduced to the smallest extent. Even though an atmosphere contains an oxidizing gas, a non-oxidizing atmosphere applicable to the process according to the present invention can be formed by reducing the pressure of the atmosphere to a degree of vacuum of not greater than 0.1 Torr.

In the sintering associated with pressing, the mixture is sintered preferably by heating the mixture to a sintering temperature at a heating rate of 5°–10° C./min. and then by maintaining the mixture at this temperature for 0.5–2 hours, in order to prevent the temperature distribution from being nonuniform. In this sintering, the pressing may be carried out since a time before the heating, may be carried out gradually as the mixture is heated, or may be carried out after the mixture is heated to a sintering temperature without carrying out the pressing during raising the temperature. Also, in sintering without pressing the mixture, the heating rate of the mixture to a sintering temperature is preferably in the same range as that in sintering with pressing.

In the process according to the present invention, ceramic powders consisting of compounds selected from groups (a) and (b) different from compounds of the main components of the ceramic composite to be obtained are used as starting materials, and a substitution reaction of chemical elements is caused between the compound selected from the group (a) and the compound selected from the group (b) by sintering. By this substitution reaction, a ceramic composite substantially comprising compounds which do not belong to the groups (a) and (b) can be obtained. For example, in the substitution reactions represented by the following reaction formulas;

$TiC + ZrB_2 \rightarrow TiB_2 + ZrC$, $TiO_2 + ZrC \rightarrow TiC + ZrO_2$, or $TiO_2 + ZrN \rightarrow TiN + ZrO_2$, Ti and Zr are substituted for each other. In the substitution reaction represented by the following reaction formula;

$TiC + HfB_2 \rightarrow TiB_2 + HfC$,

Ti and Hf are substituted for each other. Accordingly, in the sintering reaction according to the present invention, a ceramic composite is produced not by "interstitial solid solution" in the conventional sintering processes but by so-called "substitutional solid solution" wherein chemical elements are substituted between Ti and Zr or Ti and Hf in the compounds. Namely, in the present invention the ceramic composites are produced by a process quite different from the conventional processes.

Since the mass transfer occurs between the substituted chemical elements in the sintering operation associated with the substitution reaction, the ceramic composite obtained can be sufficiently densified. According to the observation of the ceramic composite obtained by the process according to the present invention, the growth of the grains does not occur so much. This is presumably understood because, in the process according to the present invention, the chemical elements can be substituted for each other by a relatively small external energy and the particle size of each original grain can be maintained substantially as it is, as compared with that, in the conventional processes where, atoms are incorporated into crystalline lattices by a large external energy such as that required in the "interstitial solid solution" type sintering where, the grain boundaries vanish and the growth of the crystal grains occurs. Moreover, in the present invention, there occurs even a case where, depending on raw materials, the crystal grains are decomposed in the substitution reaction at a temperature during sintering and the particle size of the crystal grains becomes smaller than the original size.

Further, with respect to the substitution reaction, it can be considered that a kind of decomposition of the compound occurs when or before the substitution is performed. Because the chemical elements decomposed and to be substituted for other chemical elements disperse uniformly in the material being sintered, a very uniform structure of the sintered material can be obtained after the required substitution reaction is complete. Therefore, the dispersibility of the raw powders is not a great matter, and the structure of the ceramic composite obtained can be extremely uniform even if aggregable raw powders having a bad dispersibility and a relatively small particle size are used.

Accordingly, the process of the present invention has less dependency on the particle size of the raw powders as compared with that in the conventional processes. Even raw powders obtained with a commercial base and having a relatively large particle size can be used, and the range for selection of raw powders can be broadened as well as the restriction in the mixing process of the raw powders can be greatly relaxed.

Further, in the process according to the present invention, the ranges of the sintering conditions can be greatly broadened, and the sintering at a relatively low temperature, under a relatively low pressure and in a relatively short period of time becomes possible. Presumably this is due to the fact that the external energy for the sintering is not required so much as in the conventional processes because the substitution reaction itself caused during sintering generates a large driving force for the substitution of chemical elements. In fact, according to the observation of the material being sintered on its thermal-expansion and contraction behavior, initially the substitution reaction begins at about 1000° C., a relatively low temperature, and the densification is promoted as the substitution reaction is performed. This fact indicates that it is possible to promote the densification of the material to be sintered by maintaining the material at a temperature near the temperature at which the substitution reaction begins for a relatively long period of time as well as it is possible to complete the sintering in a short period of time by raising the sintering temperature. Therefore, the sintering conditions can be selected from the broad ranges of temperature and time. Similarly, the range of sintering pressure to be applied can be broadened. In other words, the density of the material sintered by the process according to the present invention can be increased much more than that sintered by the conventional processes under the same sintering condition. To achieve a density of the sintered material in the conventional processes similar to the density according to the present invention, the pressure must be further increased, the temperature must be further raised and the time must be further lengthened.

Furthermore, in the process according to the present invention, because ceramic powders are used as raw powders, the powders or the grains adjacent to each other can bond with the normal sintering bond of a ceramic composite even if a part of the raw powders remain without reaction. Therefore, the mechanical properties of the ceramic composite obtained by the process according to the present invention can be increased as compared with those of the ceramic or the ceramic composite obtained by the conventional processes such as reaction-sintering process or self-combustion process wherein metal powders are used and a part of the metal powders remain with segregation and without reaction.

Thus, a ceramic composite is produced via "substitutional solid solution" due to the substitution reaction in the process according to the present invention. The ceramic composite thus obtained has the following interesting characteristics which cannot be observed in the ceramics or the ceramic composites produced by the conventional processes.

First, the ceramic composite obtained by the process according to the present invention has a fairly large compressive strain of the crystalline lattice. This strain of the crystalline lattice is recognized by the fact that a peak shift is present in a diffraction figure when the ceramic composite is determined by X-ray diffraction, and the peak shift is much greater than that caused by the pressing force applied in machining. Therefore, this large strain of the crystalline lattice can be considered to be caused by the substitution reaction. Namely, it can be considered that the stress capable of greatly straining the crystalline lattice is generated by the substitution reaction. The large strain of the crystalline lattice presumably contributes to the increase in the mechanical properties of the ceramic composite, because of it arrests crack propagation. This strain of the crystalline lattice is recognized in the following:

For example, when a $TiB_2$-$ZrC$ ceramic composite whose raw powders are $ZrB_2$ powders and $TiC$ powders is analyzed by the X-ray diffraction method, to have an extremely large peak shift, this means that a large strain and a large compression stress exist in the sintered body when compared to that produced by conventional processes. It is considered that this compression stress is much larger than the compression stress produced by machining or hot pressing and that this large compression stress is identified by a distorted crystalline lattice produced by substitution reaction sintering. As this large compression stress is maintained in the sintered ceramic composite, high mechanical properties are expected.

Further, peculiar grain boundary layers exist in the ceramic composite obtained by the process according to the present invention. For example, when $TiB_2$-$ZrC$ ceramic composite whose raw powders are $ZrB_2$ powders and $TiC$ powders is observed by a transmission electron microscopy, grain boundary layers almost cannot be observed at the positions between $TiB_2$ grains and between $ZrC$ grains and coherent grain boundaries at which crystal grains directly adhere to each other are formed. On the other hand, there exists a grain boundary layer between $TiB_2$ grain and $ZrC$ grain, which is presumed to be a reaction product due to the substitution reaction. Although the operation of this grain boundary layer is not clear, it can be presumed that the layer increases the bonding strength between $TiB_2$ grain and $ZrC$ grain as well as, when a difference of thermal expansion or contraction occurs between the grains, the layer prevents a crack from propagating by absorbing the difference, from the viewpoint of the fact that the mechanical properties, particularly strength and toughness, of the ceramic composite obtained by the process according to the present invention are higher than those of the composite obtained by the conventional processes.

Furthermore, although the process according to the present invention accompanies a substitution reaction, the substitution reaction is rarely completed, and more or less, intermediate products exist in the ceramic composite thus obtained. For example, when $TiB_2$-$ZrC$ ceramic composite whose raw powders are $ZrB_2$ powders and $TiC$ powders is observed, the crystal grains of $(Ti,Zr)B_2$ and $(Ti,Zr)C$ exist, and the former is $TiB_2$-rich and the latter is $ZrC$-rich. This is recognized by defining the field of view for the determination by transmission electron microscopy (TEM), confirming the existence of B and C by an electron energy loss spectroscopy (EELS) and determining the existence ratio of Ti and Zr from the peak of X-ray spectral figure using an energy dispersion X-ray spectroscopy (EDS). Such a fact described above evidently shows the trace of mass transfer, and it is peculiar with respect to the crystal structure and bonding state of crystal grains for a sintered material.

The ceramic composite obtained by the process according to the present invention has excellent mechanical properties, particularly excellent strength and toughness, and therefore, the composite can be applied to various uses such as a part of an internal combustion engine for automobiles such as a glow plug, a turbine wheel of a turbo charger, a piston cap, a lining of a cylinder, a tappet, an exhaust valve, a hot plug in a sub-combustion chamber of a diesel engine, a part of an aircraft or a spacecraft such as a fan, an air compressor of a jet engine, a housing of a combustion chamber, a heat insulator of a nose cone, a slidable part of a pump, a die, a tool, cutlery, a thread guide, heat resisting pipe, a pipe for a high-temperature gas, a crucible for dissolution, a roll for a rolling mill, etc.

BRIEF DESCRIPTION OF THE DRAWINGS

The objects, features and advantages of the present invention will become apparent and more readily appreciated from the following detailed description of the preferred exemplary embodiments of the invention, taken in conjunction with the accompanying drawings, in which.

DETAILED DESCRIPTION OF THE PREFERRED EMBODIMENTS

Figure 1:
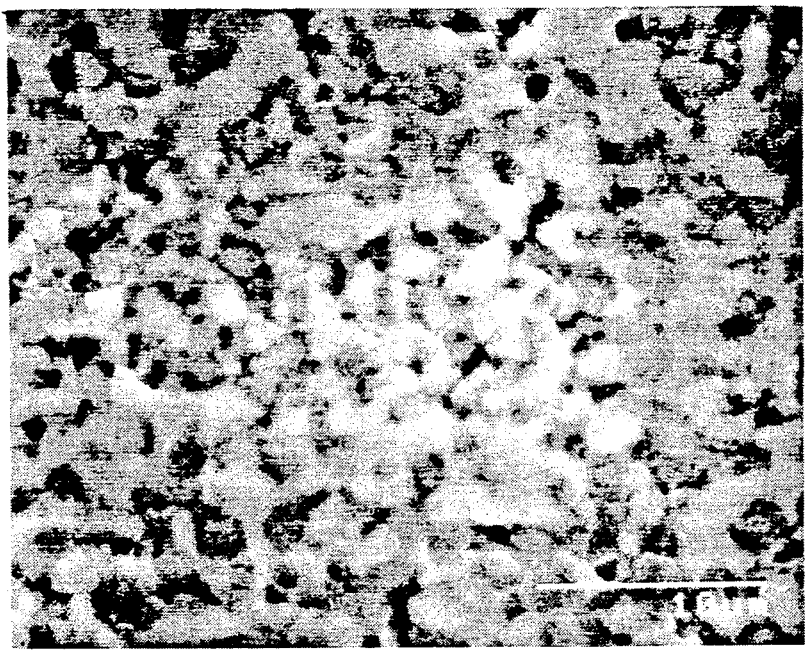
FIG. 1 is a microphotograph of the microstructure of a $TiB_2$-$ZrC$ ceramic composite according to an embodiment (Example 1) of the present invention.

Some preferred embodiments of the present invention will be described hereunder referring to the attached drawings (microphotographs).

First, methods for determining the compositions and properties of the sintered materials in the Examples and Comparative Examples described later will be explained.

(1) Bend strength

Three-point bend loading based on JIS-1601 was used to measure the bend strength of the ceramic composite. The shape of a sample was defined to 3×4×48 mm and the mausoleums of the sample extending in its longitudinal direction were cut by chamfering at 0.2C. The parallelism between the upper and lower surfaces of the sample was maintained within 0.2%, and the respective surface roughnesses were controlled to 0.8S by polishing them with a diamond grindstone having a grade of #400. The loading speed was 0.5 mm/min. The bend strength was defined as an average strength calculated from the measured data of ten samples.

(2) Vickers hardness

It is measured by a micro-Vickers hardness meter under the conditions of a load of 500 g and a loading time of 15 seconds. The measurement was carried out at five points for each sample, and the Vickers hardness was defined as the average hardness. As a pretreatment for this measurement, the sample after the measurement of bend strength described above was polished to a mirror finish by an automatic polishing machine. The automatic polishing machine was precision polishing system MA-200 produced by Musashino Denshi (a Japanese company), and the finishing polish was conducted by cloth polishing using an abrasive with diamond powders having a particle-size distribution from 1 $\mu$m to 4 $\mu$m.

(3) Fracture toughness

The measurement was carried out by a micro-indentation method and the fracture toughness was calculated using Niihara's equation which was disclosed in Journal of the American Ceramic Society, 65(7), C-116, July 1982.

The same pretreatment as in the measurement of Vickers hardness was conducted. The measurement was carried out using a Vickers hardness meter under the conditions of a load of 10 kg and a loading time of 15 seconds. After an indenter was press fitted into the sample, the indent and crack caused by the press fitting were observed. When the length of the crack was not less than 2.5 times the length of the half-diagonal of the indent, the crack was defined as a median type crack, and when the length of the crack was less than 2.5 times the length of the half-diagonal of the indent, the crack was defined as a Palmqvist type crack, and then, the fracture toughness was calculated.

(4) Composition of sintered material

The composition of a sintered material was identified by X-ray diffraction method. In the measurement, a Cu light source was used, the voltage thereof was set to 30 kV and the current thereof was controlled to 20A. The ratio of an emitter slit, a receiver slit and a scattering slit was set to 1:0.5:1. The scanning speed was 4°/min. and the time constant was ¼. The schematic composition of the sample was determined from the height of main peaks in the diffraction figure obtained in the measurement range of 20°–80°.

(5) Density

The measurement was carried out by Archimedian method using the sample used for the measurement of bend strength. This density was indicated as not an absolute value but a relative value (unit: %) by dividing the measured data by a theoretical value. However, since a material having a relative density of not greater than 95% is a porous material and such a material absorbs moisture, a precise relative density cannot be determined by this method. Accordingly, in the determination of such a material, the outer shape of the sample was measured and the density of the sample was determined from the weight and volume thereof.

EXAMPLES 1-6, COMPARATIVE EXAMPLE 1

In Example 1, ZrB$_2$ powders having an average particle size of 0.5 $\mu$m and TiC powders having an average particle size of 2.0 $\mu$m were mixed at 1:1 in mole ratio. The mixture was blended and milled in ethanol for six hours by an attrition mill using media of SiC balls having a diameter of 3 mm, and further the mixture was dried under reduced pressure by a rotary evaporator. Then, the mixture was hot pressed under vacuum for one hour at a temperature of 1800° C. to obtain a ceramic composite. The pressure was set to 20 MPa. Thereafter, the obtained ceramic composite was cut by using a diamond to make a sample having a thickness of 3 mm, a width of 4 mm and a length of 38 mm. The bend strength of this sample was determined by the three-point bend loading method based on JIS-1601 at a room temperature and 1000° C. As a result, the room-temperature bend strength was 55 kg/mm$^2$ and the high-temperature bend strength at 1000° C. was 93 kg/mm$^2$. The high-temperature bend strength at 1000° C. was surprisingly 1.7 times the room-temperature bend strength.

In Examples 2-6, the kind of starting materials was changed, and the mixing and sintering were carried out in a manner similar to that in Example 1.

The conditions and the resulted data in these Examples 1-6 are shown in Table 1.

Further, the microphotograph of the microstructure of TiB$_2$-ZrC ceramic composite obtained in Example 1 is shown in FIG. 1. The structure of the sintered material comprises two phases of TiB$_2$ and ZrC, the gray portions in the photograph are TiB$_2$ and the white portions are ZrC. The respective grain sizes are about 2 $\mu$m and 3 $\mu$m, and the grain size of ZrC is greater than that of TiB$_2$.

Figure 2:
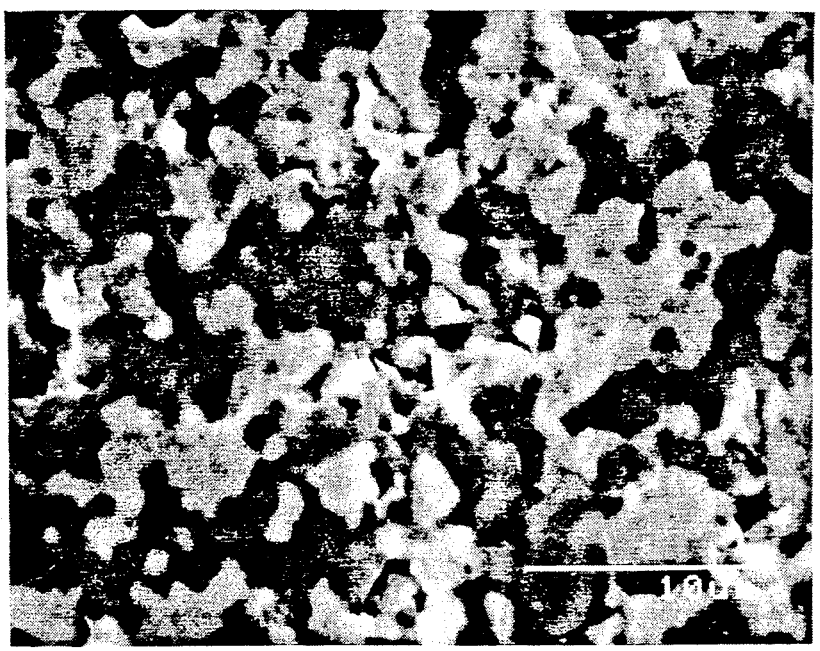
FIG. 2 is a microphotograph of the microstructure of a $TiB_2$-$ZrC$ ceramic composite produced by a conventional process (Comparative Example 1)

In Comparative Example 1, ceramic powders of TiB$_2$ and ZrC were used as starting materials. After the ceramic powders were mixed, the mixture was sintered by hot pressing. The resulted data are shown in Table 1. The microphotograph of the microstructure of $TiB_2$-ZrC composite obtained is shown in FIG. 2. The structure of the sintered material also comprises two phases of $TiB_2$ and ZrC similarly to in FIG. 1, but the observed grain size of $TiB_2$ is greater than that in FIG. 1, because the aggregation of $TiB_2$ grains was remarkable.

In Table 1, mixing ratio and composition ratio are indicated in mole ratio, "HT" in the column of bend strength means a high-temperature bend strength at 1000° C. and other data in the same column show room-temperature bend strengths.

EXAMPLES 14–16

In Example 14, $ZrB_2$ powders having an average particle size of 1.0 μm and TiC powders having an average particle size of 2.0 μm were mixed at 1:1 in mole ratio. The mixture was blended and milled in ethanol for six hours by an attrition mill using media of SiC balls having a diameter of 3 mm. 10 vol. % SiC whiskers which had been unformly dispersed using ultrasonic waves in ethanol solution containing 1% polyethylene imine were added as a third component to the mixture, and then, the mixture was dispersed and blended for twelve hours by a ball mill in which 5 mm-diameter and

TABLE 1

| No. | Raw powder (a) average particle size (μm) | Raw powder (b) average particle size (μm) | Mixing ratio (a:b) | Sintering conditions Temp. (°C.) | Time (hr) | Pressure (MPa) | Composition (Composition ratio) | Relative density | Bend strength (kg/mm²) | Vickers hardness (kg/mm²) | Fracture toughness (MPa · m½) |
|---|---|---|---|---|---|---|---|---|---|---|---|
| Ex. 1 | $ZrB_2$ 0.5 | TiC 2.0 | 1:1 | 1800 | 1 | 20 | $TiB_2$/ZrC (1:1) | 99 | 55 HT 93 | 2400 | 5.2 |
| Ex. 2 | $ZrB_2$ 0.5 | TiN 1.7 | 1:1 | 1750 | 1 | 20 | $TiB_2$/ZrN (1:1) | 97 | 47 | 1900 | 6.8 |
| Ex. 3 | $HfB_2$ 1.4 | TiC 2.0 | 1:1 | 1850 | 1 | 20 | $TiB_2$/HfC (1:1) | 98 | — | 2240 | 4.8 |
| Ex. 4 | $HfB_2$ 1.4 | TiN 0.8 | 1:1 | 1800 | 1 | 20 | $TiB_2$/HfN (1:1) | 97 | — | 1780 | 6.6 |
| Ex. 5 | ZrC 2.0 | TiN 1.7 | 1:1 | 1700 | 1 | 20 | TiC/ZrN (1:1) | 98 | 46 | 1770 | 6.4 |
| Ex. 6 | HfC 1.9 | TiN 1.7 | 1:1 | 1750 | 1 | 20 | TiC/HfN (1:1) | 97 | — | 1680 | 5.9 |
| Com. Ex. 1 | $TiB_2$ 0.8 | ZrC 2.0 | 1:1 | 1800 | 1 | 20 | $TiB_2$/ZrC (1:1) | 97 | 37 HT 85 | 1990 | 5.4 |

EXAMPLES 7–13

The ceramic powders selected from group (a) were prepared as two kinds of raw powders of (a1) and (a2), and the two kinds of ceramic powders were mixed with the ceramic powders selected from group (b) at a mixing ratio of (a1):(a2):(b)=1:1:2. The mixture was sintered in a manner similar to that in Example 1. The conditions and the resulted data in these Examples are shown in Table 2.

10 mm-diameter SiC balls were mixed at a mixing ratio in weight of 1:1. After the blending, the mixture was dried under reduced pressure by a rotary evaporator. Then, the mixture was hot pressed under vacuum for one hour at a temperature of 1900° C. to obtain a ceramic composite. The pressure was set the 25 MPa. Thereafter, the obtained ceramic composite was cut by using a diamond to make a sample having a thickness of 3 mm, a width of 4 mm and a length of 38 mm. The bend strength of this sample was determined by the aforementioned three-point bend loading method. The relative density of the sintered material reached 99%, the

TABLE 2

| No. | Raw powder (a1) average particle size (μm) | Raw powder (a2) average particle size (μm) | Raw powder (b) average particle size (μm) | Mixing ratio (a1:a2:b) | Sintering conditions Temp. (°C.) | Time (hr) | Pressure (MPa) | Composition (Composition ratio) | Relative density | Bend strength (kg/mm²) | Vickers hardness (kg/mm²) | Fracture toughness (MPa · m½) |
|---|---|---|---|---|---|---|---|---|---|---|---|---|
| Ex. 7 | $ZrB_2$ 0.5 | $HfB_2$ 1.4 | TiC 2.0 | 1:1:2 | 1850 | 1 | 20 | $TiB_2$/ZrC/HfC (2:1:1) | 98 | — | 2210 | 5.5 |
| Ex. 8 | $ZrB_2$ 0.5 | $HfB_2$ 1.4 | TiN 1.7 | 1:1:2 | 1800 | 1 | 20 | $TiB_2$/ZrN/HfN (2:1:1) | 98 | — | 1550 | 6.7 |
| Ex. 9 | $ZrB_2$ 0.5 | ZrC 2.0 | TiN 1.7 | 1:1:2 | 1800 | 1 | 20 | $TiB_2$/TiC/ZrN (1:1:2) | 98 | 63 | 1650 | 5.8 |
| Ex. 10 | $ZrB_2$ 0.5 | HfC 1.9 | TiN 1.7 | 1:1:2 | 1800 | 1 | 20 | $TiB_2$/TiC/ ZrN/HfN (1:1:1:1) | 98 | — | 1730 | 5.8 |
| Ex. 11 | $ZrB_2$ 0.5 | ZrN 1.7 | TiC 2.0 | 1:1:2 | 1800 | 1 | 20 | $TiB_2$/ZrN/HfN (2:1:1) | 98 | — | 1820 | 5.9 |
| Ex. 12 | $ZrB_2$ 0.5 | HfN 2.2 | TiC 2.0 | 1:1:2 | 1800 | 1 | 20 | $TiB_2$/TiC/ZrN (1:1:2) | 98 | 58 | 1650 | 5.7 |
| Ex. 13 | $HfB_2$ 1.4 | HfN 2.2 | TiC 2.0 | 1:1:2 | 1800 | 1 | 20 | $TiB_2$/TiC/ ZrN/HfN (1:1:1:1) | 98 | — | 1680 | 5.6 | room-temperature bend strength was 110 kg/mm$^2$, the Vickers hardness was 2,180 kg/mm$^2$ and the fracture toughness was 5.3 MPa.m$^{\frac{1}{2}}$.

Figure 6:
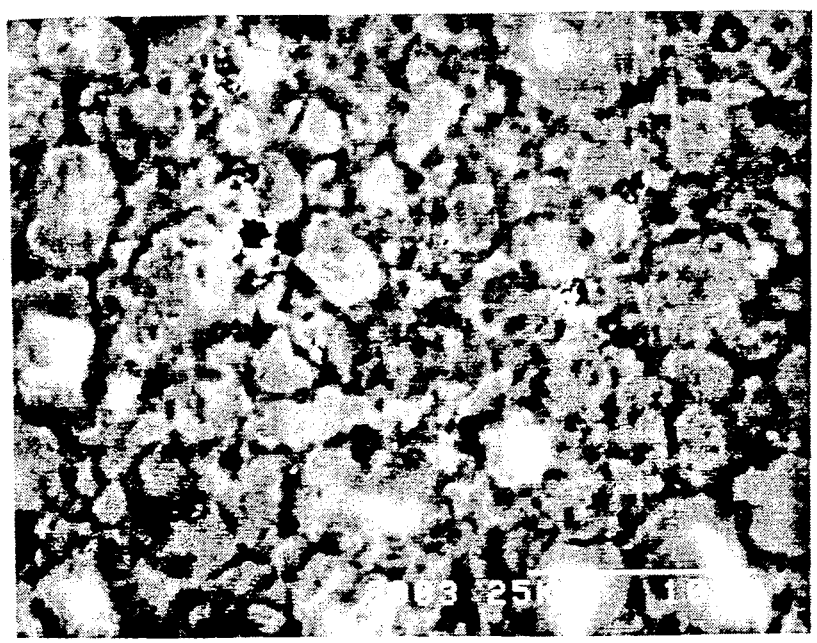
FIG. 6 is a microphotograph of the microstructure of a TiC-ZrO$_2$ ceramic composite according to a further embodiment (Example 23) of the present invention.

In Examples 15 and 16, the addition of the SiC whiskers was changed. The conditions and the resulted data are shown in Table 3.

wherein Y$_2$O$_3$ was not added is shown in FIG. 6. The composition of the sintered material comprises TiC and monoclinic ZrO$_2$. The two-phase structure wherein ZrO$_2$ densely surrounded TiC whose grain grew to a several-microns size can be observed.

The microphotograph of the microstructure of TiC-

TABLE 3

| No. | Raw powder (a) average particle size (μm) | Raw powder (b) average particle size (μm) | Mixing ratio (a:b) | Third component average size (μm), addition | Sintering conditions Temp. (°C.) | Time (hr) | Pressure (MPa) |
|---|---|---|---|---|---|---|---|
| Ex. 14 | ZrB$_2$ 1.0 | TiC 2.0 | 1:1 | SiC whisker 1.4 φ × 6L, 10 vol % | 1900 | 1 | 25 |
| Ex. 15 | ZrB$_2$ 1.0 | TiC 2.0 | 1:1 | SiC whisker 1.4 φ × 6L, 20 vol % | 1900 | 1 | 25 |
| Ex. 16 | ZrB$_2$ 1.0 | TiC 2.0 | 1:1 | SiC whisker 1.4 φ × 6L, 30 vol % | 1900 | 1 | 25 |

| No. | Composition (Composition ratio) | Relative density | Bend strength (kg/mm$^2$) | Vickers hardness (kg/mm$^2$) | Fracture toughness (MPa·m$^{\frac{1}{2}}$) |
|---|---|---|---|---|---|
| Ex. 14 | TiB$_2$/ZrC/SiC | 99 | 110 | 2180 | 5.3 |
| Ex. 15 | TiB$_2$/ZrC/SiC | 99 | 132 | 2250 | 5.5 |
| Ex. 16 | TiB$_2$/ZrC/SiC | 98 | 123 | 2430 | 5.9 |

EXAMPLES 17–30, COMPARATIVE EXAMPLES 2–4

In Examples 17–30, the effect due to the addition of Y$_2$O$_3$ as a stabilizer to the mixture of the ceramic powders selected from group (a) and the ceramic powders selected from group (b) was estimated. In any case of adding Y$_2$O$_3$ or not adding Y$_2$O$_3$ in these Examples, the mixture was blended and sintered in a manner similar to that in Example 1. The conditions and the resulted data are shown in Table 4.

Figure 3:
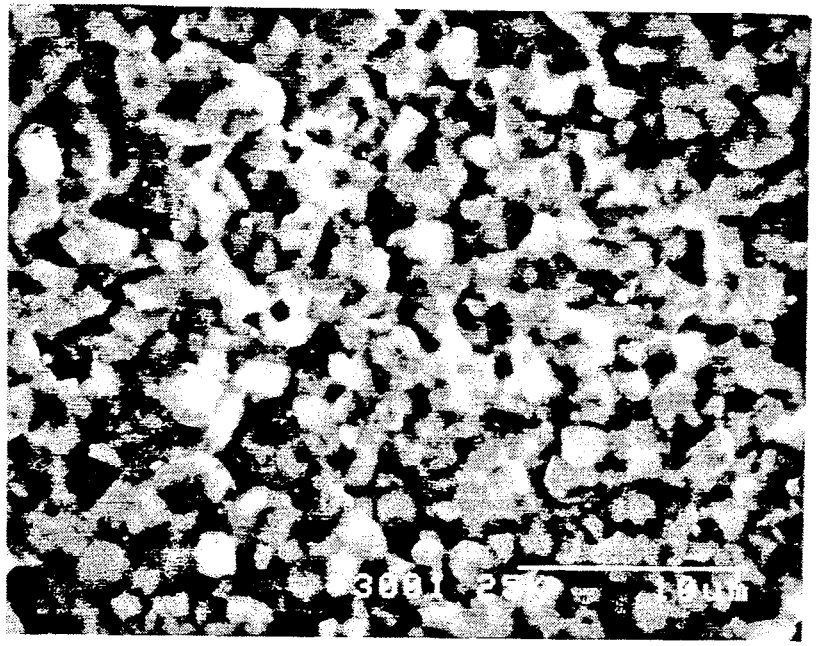
FIG. 3 is a microphotograph of the microstructure of a $TiB_2$-$ZrO_2$ ceramic composite according to another embodiment (Example 17) of the present invention.

The microphotograph of the microstructure of TiB$_2$-ZrO$_2$ ceramic composite obtained in Example 17 wherein Y$_2$O$_3$ was not added is shown in FIG. 3. The composition of the sintered material comprises TiB$_2$ and monoclinic ZrO$_2$. Because the monoclinic ZrO$_2$ was produced, the structure was porous.

Figure 4:
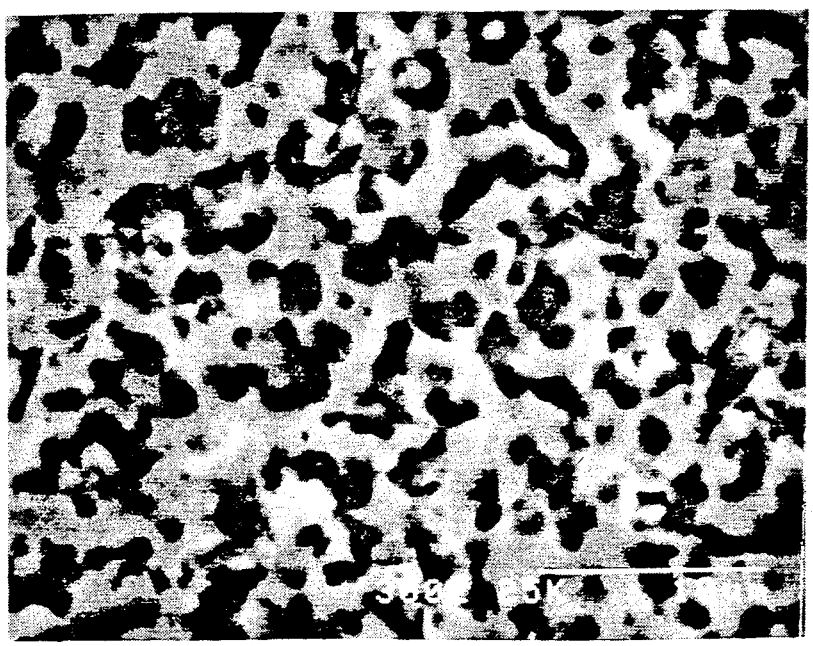
FIG. 4 is a microphotograph of the microstructure of a $TiB_2$-$ZrO_2$-$Y_2O_3$ ceramic composite according to a further embodiment (Example 18) of the present invention.

The microphotograph of the microstructure of TiB$_2$-ZrO$_2$ ceramic composite obtained in Example 18 wherein Y$_2$O$_3$ was added is shown in FIG. 4. The composition of the sintered material comprises TiB$_2$ and tetragonal ZrO$_2$. So-called sea-island structure (sea is ZrO$_2$ and island is TiB$_2$) is observed as a very dense and fine structure by adding the Y$_2$O$_3$.

The microphotograph of the microstructure of TiC-ZrO$_2$ ceramic composite obtained in Example 23

Figure 7:
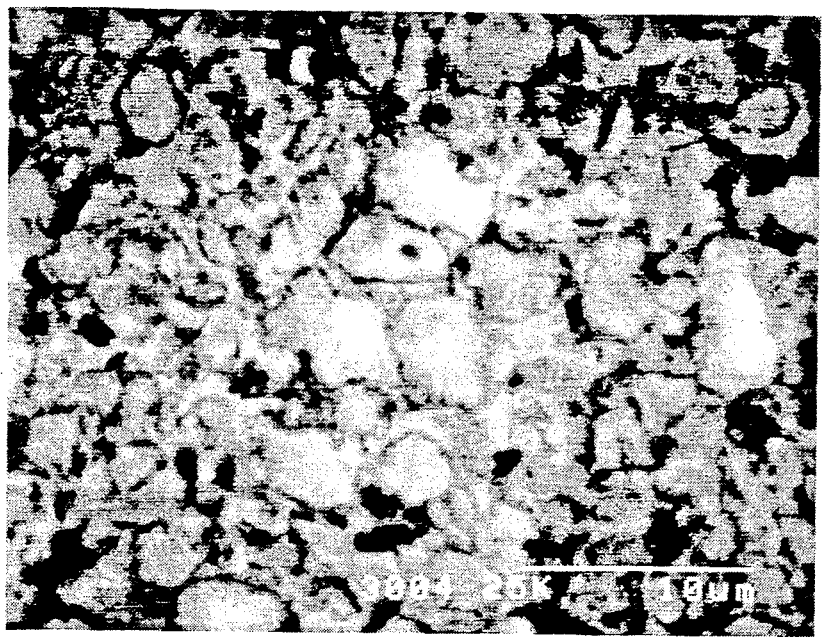
FIG. 7 is a microphotograph of the microstructure of a TiC-ZrO$_2$-Y$_2$O$_3$ ceramic composite according to a further embodiment (Example 24) of the present invention.

ZrO$_2$ ceramic composite obtained in Example 24 wherein Y$_2$O$_3$ was added is shown in FIG. 7. The composition of the sintered material comprises TiC and tetragonal ZrO$_2$. Although the structure is similar to that in FIG. 6, pores almost cannot be observed and the structure becomes denser.

In Comparative Examples 2–4, the starting materials were ceramic powders having the same compositions as those of components in the ceramic composite finally obtained. The conditions and the resulted data are shown in Table 4. The ceramic composites obtained in these Comparative Examples were porous and brittle.

Figure 5:
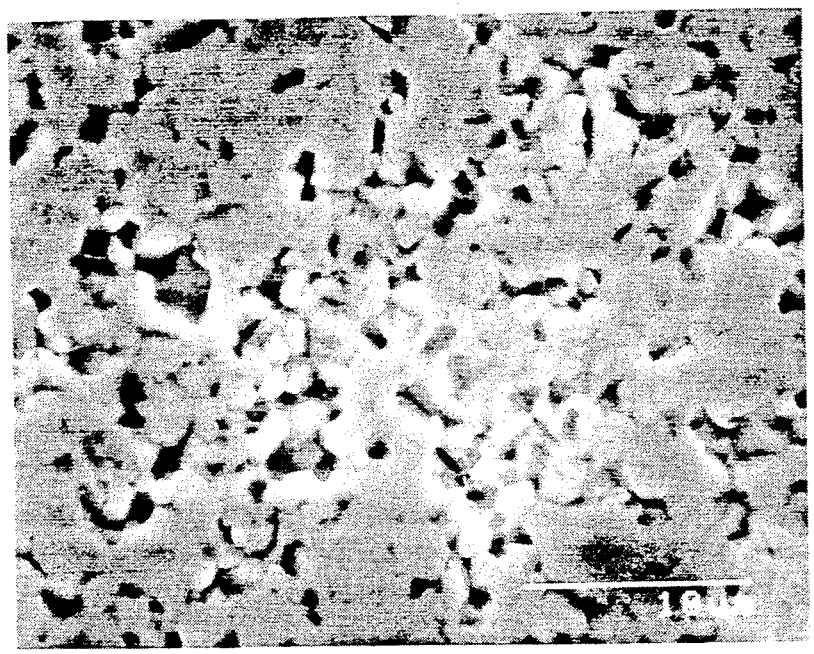
FIG. 5 is a microphotograph of the microstructure of a $TiB_2$-3 mol. % $Y_2O_3$-$ZrO_2$ ceramic composite produced by a conventional process (Comparative Example 2)

The microphotograph of the microstructure of the ceramic composite obtained in Comparative Example 2 is shown in FIG. 5. The structure of the sintered material was very porous and the relative density thereof was 83% and very low.

Figure 8:
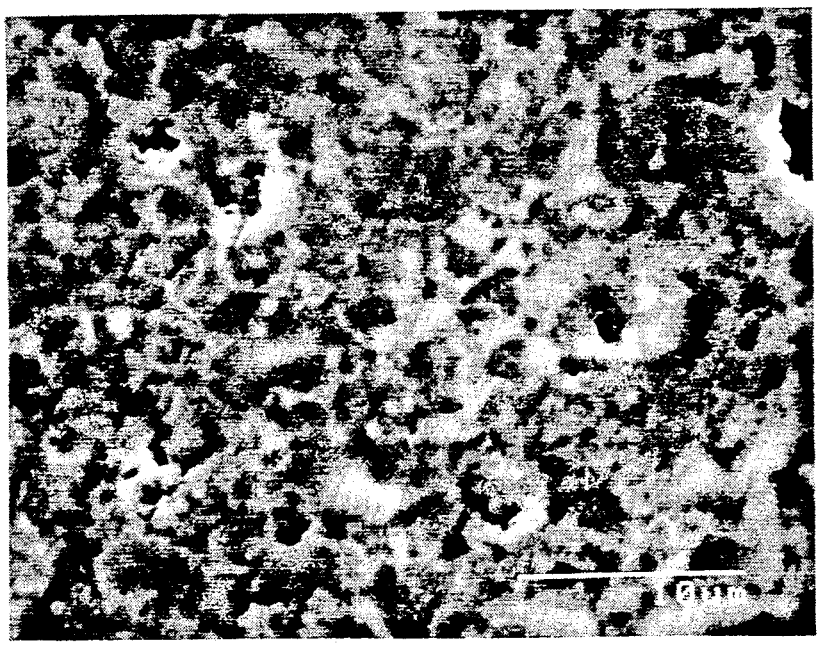
FIG. 8 is a microphotograph of the microstructure of a TiC-3 mol. % Y$_2$O$_3$-ZrO$_2$ ceramic composite produced by a conventional process (Comparative Example 3).

The microphotograph of the microstructure of the ceramic composite obtained in Comparative Example 3 is shown in FIG. 8. In the photograph, the structure is observed as a two-phase structure having several-microns TiC grains and ZrC surrounding the TiC grains. There are many residual pores in the structure.

In Table 4 and Tables shown hereinafter, (m) in the column of composition of sintered material means "monoclinic" and (t) means "tetragonal".

TABLE 4

| No. | Raw powder (a) average particle size (μm) | Raw powder (b) average particle size (μm) | Mixing ratio (a:b) | Y$_2$O$_3$ Ave. size (μm) | Y$_2$O$_3$ Addition (mol %) | Sintering conditions Temp. (°C.) | Time (hr) | Pressure (MPa) |
|---|---|---|---|---|---|---|---|---|
| Ex. 17 | ZrB$_2$ 0.8 | TiO$_2$ 0.2 | 1:1 | — | | 1600 | 1 | 20 |
| Ex. 18 | ZrB$_2$ 0.5 | TiO$_2$ 0.2 | 1:1 | 0.2 | 3 | 1600 | 1 | 20 |
| Ex. 19 | ZrB$_2$ 0.5 | TiO$_2$ 0.2 | 1:1 | 0.2 | 4 | 1600 | 1 | 20 |
| Ex. 20 | ZrB$_2$ | TiO$_2$ | 1:1 | 0.2 | 6 | 1650 | 1 | 20 |

TABLE 4-continued

| No. | | | | | | Temp. (°C.) | Time (hr) | Pressure (MPa) |
|---|---|---|---|---|---|---|---|---|
| Ex. 21 | $HfB_2$ 1.4 | $TiO_2$ 0.02 | 1:1 | — | | 1700 | 1 | 20 |
| Ex. 22 | $HfB_2$ 1.4 | $TiO_2$ 0.02 | 1:1 | 0.2 | 3 | 1700 | 1 | 20 |
| Ex. 23 | ZrC 0.8 | $TiO_2$ 0.2 | 1:1 | — | | 1700 | 1 | 20 |
| Ex. 24 | ZrC 0.8 | $TiO_2$ 0.2 | 1:1 | 0.2 | 3 | 1700 | 1 | 20 |
| Ex. 25 | HfC 1.9 | $TiO_2$ 0.02 | 1:1 | — | | 1800 | 1 | 20 |
| Ex. 26 | HfC 1.9 | $TiO_2$ 0.02 | 1:1 | 0.2 | 3 | 1750 | 1 | 20 |
| Ex. 27 | ZrN 1.7 | $TiO_2$ 0.2 | 1:1 | — | | 1700 | 1 | 20 |
| Ex. 28 | ZrN 1.7 | $TiO_2$ 0.2 | 1:1 | 0.2 | 3 | 1700 | 1 | 20 |
| Ex. 29 | HfN 2.2 | $TiO_2$ 0.02 | 1:1 | — | | 1700 | 1 | 20 |
| Ex. 30 | HfN 2.2 | $TiO_2$ 0.02 | 1:1 | 0.2 | 3 | 1700 | 1 | 20 |
| Com. Ex. 2 | $TiB_2$ 0.8 | $ZrO_2$(t) 0.1 | 1:1 | 0.2 | 3 | 1600 | 1.5 | 20 |
| Com. Ex. 3 | TiC 2.0 | $ZrO_2$(t) 0.1 | 1:1 | 0.2 | 3 | 1750 | 1.5 | 20 |
| Com. Ex. 4 | TiN 1.7 | $ZrO_2$(t) 0.1 | 1:1 | 0.2 | 3 | 1650 | 1 | 20 |

| | Composition of sintered material and characteristics thereof | | | |
|---|---|---|---|---|
| No. | Composition (Composition ratio) | Relative density | Bend strength (kg/mm$^2$) | Vickers hardness (kg/mm$^2$) | Fracture toughness (MPa·m$^{\frac{1}{2}}$) |
| Ex. 17 | $TiB_2/ZrO_2$(m) | 92 | 25 | 1250 | — |
| Ex. 18 | $TiB_2/ZrO_2$(t) | 97 | 30 | 1650 | 15.0 |
| Ex. 19 | $TiB_2/ZrO_2$(t) | 98 | 48 | 1750 | 7.3 |
| Ex. 20 | $TiB_2/ZrO_2$(t+c) | 98 | 37 | 1850 | 4.1 |
| Ex. 21 | $TiB_2/HfO_2$(m) | 91 | — | 690 | — |
| Ex. 22 | $TiB_2/HfO_2$(t) | 97 | — | 1430 | 5.1 |
| Ex. 23 | $TiC/ZrO_2$(m) | 97 | — | 1170 | 14.4 |
| Ex. 24 | $TiC/ZrO_2$(t) | 99 | 105 | 1850 | 7.0 |
| Ex. 25 | $TiC/HfO_2$(m) | 90 | — | 730 | — |
| Ex. 26 | $TiC/HfO_2$(t) | 99 | — | 1890 | 4.5 |
| Ex. 27 | $TiN/ZrO_2$(m) | 88 | — | 610 | — |
| Ex. 28 | $TiN/ZrO_2$(t) | 99 | 77 | 1290 | 5.3 |
| Ex. 29 | $TiN/HfO_2$(m) | 96 | — | 670 | — |
| Ex. 30 | $TiN/HfO_2$(t) | 99 | — | 1360 | 4.7 |
| Com. Ex. 2 | $TiB_2/ZrO_2$(t) | 83 | 7 | 910 | — |
| Com. Ex. 3 | $TiC/ZrO_2$(t) | 94 | 65 | 1030 | 5.1 |
| Com. Ex. 4 | $TiN/ZrO_2$(t) | 95 | 78 | 1020 | 5.5 |

EXAMPLES 31-39

The ceramic powders selected from group (b) were prepared as two kinds of raw powders of (b1) and (b2), the raw powders of (b2) were fixed as $TiO_2$ powders, the two kinds of ceramic powders were mixed with the ceramic powders selected from group (a), and further $Y_2O_3$ was added to the mixture as a stabilizer. Then the mixture was sintered in a manner similar to that in Example 1. The conditions and the resulted data are shown in Table 5.

EXAMPLES 40-53

The ceramic powders selected from group (a) were prepared as two kinds of raw powders of (a1) and (a2), and the ceramic powders selected from group (b) were fixed as $TiO_2$ powders. These powders were mixed, and $Y_2O_3$ was added to the mixture as a stabilizer. (In only Example 50, $Y_2O_3$ was not added.) Then the mixture was sintered in a manner similar to that in Example 1. The conditions and the resulted data are shown in Table 6.

TABLE 5

| | Raw powder | | | | $Y_2O_3$ | | Sintering conditions | | |
|---|---|---|---|---|---|---|---|---|---|
| No. | Raw powder (a) average particle size (μm) | Raw powder (b1) average particle size (μm) | $TiO_2$ powder (b2) average particle size (μm) | Mixing ratio (a:b1:b2) | Ave. size (μm) | Addition (mol %) | Temp. (°C.) | Time (hr) | Pressure (MPa) |
| Ex. 31 | $ZrB_2$ 0.8 | TiC 2.0 | 0.02 | 2:1:1 | 0.2 | 3 | 1650 | 1 | 20 |
| Ex. 32 | $ZrB_2$ | TiN | 0.02 | 2:1:1 | 0.2 | 3 | 1600 | 1 | 20 |

TABLE 5-continued

| No. | | | | | | | | | |
|---|---|---|---|---|---|---|---|---|---|
| Ex. 33 | HfB$_2$ 1.4 | TiC 2.0 | 0.02 | 2:1:1 | 0.2 | 3 | 1750 | 1 | 20 |
| Ex. 34 | HfB$_2$ 1.4 | TiN 1.7 | 0.02 | 2:1:1 | 0.2 | 3 | 1700 | 1 | 20 |
| Ex. 35 | ZrC 0.5 | TiN 1.7 | 0.02 | 2:1:1 | 0.2 | 3 | 1600 | 1 | 20 |
| Ex. 36 | HfC 1.9 | TiN 1.7 | 0.02 | 2:1:1 | 0.2 | 3 | 1700 | 1 | 20 |
| Ex. 37 | ZrN 1.7 | TiC 2.0 | 0.02 | 2:1:1 | 0.2 | 3 | 1600 | 1 | 20 |
| Ex. 38 | HfN 2.2 | TiC 2.0 | 0.02 | 2:1:1 | 0.2 | 3 | 1700 | 1 | 20 |
| Ex. 39 | ZrB$_2$ 0.8 | HfB$_2$ 1.4 | 0.02 | 2:1:1 | 0.2 | 3 | 1650 | 1 | 20 |

| | Composition of sintered material and characteristics thereof | | | | |
|---|---|---|---|---|---|
| No. | Composition (Composition ratio) | Relative density | Bend strength (kg/mm$^2$) | Vickers hardness (kg/mm$^2$) | Fracture toughness (MPa·m$^{\frac{1}{2}}$) |
| Ex. 31 | TiB$_2$/ZrC/ZrO$_2$(t) 2:1:1 | 99 | 85 | 1850 | 7.2 |
| Ex. 32 | TiB$_2$/ZrN/ZrO$_2$(t) 2:1:1 | 99 | 77 | 1660 | 6.9 |
| Ex. 33 | TiB$_2$/HfC/HfO$_2$(t) 2:1:1 | 99 | — | 1540 | 4.8 |
| Ex. 34 | TiB$_2$/HfN/HfO$_2$(t) 2:1:1 | 99 | — | 1420 | 5.1 |
| Ex. 35 | TiC/ZrN/ZrO$_2$(t) 2:1:1 | 99 | 69 | 1980 | 6.7 |
| Ex. 36 | TiC/HfN/HfO$_2$(t) 2:1:1 | 99 | — | 1390 | 4.4 |
| Ex. 37 | TiN/ZrC/ZrO$_2$(t) 2:1:1 | 99 | 71 | 1580 | 6.9 |
| Ex. 38 | TiN/HfC/HfO$_2$(t) 2:1:1 | 99 | — | 1450 | 4.6 |
| Ex. 39 | TiB$_2$/ZrO$_2$(t)/HfO$_2$(t) 2:1:1 | 99 | — | 1910 | 5.7 |

TABLE 6

| | Raw powder | | | | Y$_2$O$_3$ | | Sintering conditions | | |
|---|---|---|---|---|---|---|---|---|---|
| No. | Raw powder (a1) average particle size (μm) | Raw powder (a2) average particle size (μm) | TiO$_2$ powder (b) average particle size (μm) | Mixing ratio (a1:a2:b) | Ave. size (μm) | Addition (mol %) | Temp. (°C.) | Time (hr) | Pressure (MPa) |
| Ex. 40 | ZrB$_2$ 0.8 | ZrC 0.8 | 0.02 | 1:1:2 | 0.2 | 3 | 1600 | 1 | 20 |
| Ex. 41 | ZrB$_2$ 0.8 | HfC 1.9 | 0.02 | 1:1:2 | 0.2 | 3 | 1650 | 1 | 20 |
| Ex. 42 | HfB$_2$ 1.4 | ZrC 0.5 | 0.02 | 1:1:2 | 0.2 | 3 | 1650 | 1 | 20 |
| Ex. 43 | HfB$_2$ 1.4 | HfC 1.9 | 0.02 | 1:1:2 | 0.2 | 3 | 1700 | 1 | 20 |
| Ex. 44 | ZrC 0.5 | HfC 1.9 | 0.02 | 1:1:2 | 0.2 | 3 | 1600 | 1 | 20 |
| Ex. 45 | ZrB$_2$ 0.8 | ZrN 1.7 | 0.02 | 1:1:2 | 0.2 | 3 | 1600 | 1 | 20 |
| Ex. 46 | ZrB$_2$ 0.8 | HfN 2.2 | 0.02 | 1:1:2 | 0.2 | 3 | 1650 | 1 | 20 |
| Ex. 47 | HfB$_2$ 1.9 | ZrN 1.7 | 0.02 | 1:1:2 | 0.2 | 3 | 1650 | 1 | 20 |
| Ex. 48 | HfB$_2$ 1.9 | HfN 2.2 | 0.02 | 1:1:2 | 0.2 | 3 | 1700 | 1 | 20 |
| Ex. 49 | ZrC 0.5 | ZrN 1.7 | 0.02 | 1:1:2 | — | | 1700 | 1 | 20 |
| Ex. 50 | ZrC 0.5 | ZrN 1.7 | 0.02 | 1:1:2 | 0.2 | 3 | 1700 | 1 | 20 |
| Ex. 51 | ZrC 0.5 | HfN 2.2 | 0.02 | 1:1:2 | 0.2 | 3 | 1600 | 1 | 20 |
| Ex. 52 | HfC 1.9 | ZrN 1.7 | 0.02 | 1:1:2 | 0.2 | 3 | 1650 | 1 | 20 |
| Ex. 53 | ZrN 1.7 | HfN 2.2 | 0.02 | 1:1:2 | 0.2 | 3 | 1650 | 1 | 20 |

| | Composition of sintered material and characteristics thereof | | | |
|---|---|---|---|---|
| | Composition | Bend | Vickers | Fracture |

TABLE 6-continued

| No. | (Composition ratio) | Relative density | strength (kg/mm²) | hardness (kg/mm²) | toughness (MPa·m½) |
|---|---|---|---|---|---|
| Ex. 40 | TiB₂/TiC/ZrO₂(t) 1:1:2 | 99 | 113 | 1850 | 6.3 |
| Ex. 41 | TiB₂/TiC/ZrO₂(t)/HfO₂(t) 1:1:1:1 | 99 | — | 1650 | 5.4 |
| Ex. 42 | TiB₂/TiC/ZrO₂(t)/HfO₂(t) 1:1:1:1 | 99 | — | 1670 | 5.3 |
| Ex. 43 | TiB₂/TiC/HfO₂(t) 1:1:2 | 99 | — | 1890 | 6.1 |
| Ex. 44 | TiC/ZrO₂(t)/HfO₂(t) 2:1:1 | 99 | — | 1810 | 5.8 |
| Ex. 45 | TiB₂/TiN/ZrO₂(t) 1:1:2 | 99 | 96 | 1580 | 5.2 |
| Ex. 46 | TiB₂/TiN/ZrO₂(t)/HfO₂(t) 1:1:1:1 | 99 | — | 1590 | 5.4 |
| Ex. 47 | TiB₂/TiN/ZrO₂(t)/HfO₂(t) 1:1:1:1 | 99 | — | 1610 | 5.8 |
| Ex. 48 | TiB₂/TiN/HfO₂(t) 1:1:2 | 99 | — | 1570 | 5.5 |
| Ex. 49 | TiCN/ZrO₂(m) 1:1 | 99 | — | 630 | — |
| Ex. 50 | TiCN/ZrO₂(t) 1:1 | 99 | 89 | 1510 | 5.2 |
| Ex. 51 | TiCN/ZrO₂(t)/HfO₂(t) 2:1:1 | 99 | — | 1490 | 5.3 |
| Ex. 52 | TiCN/ZrO₂(t)/HfO₂(t) 2:1:1 | 99 | — | 1480 | 5.3 |
| Ex. 53 | TiCN/ZrO₂(t)/HfO₂(t) 2:1:1 | 99 | — | 1480 | 5.3 |

EXAMPLES 54-72

The ceramic powders selected from group (b) were fixed as TiO₂ powders, and the kind of the ceramic powders selected from group (a) was changed. Y₂O₃ was added, and various third components were added. The mixture was sintered in a manner similar to that in Example 1. The conditions and the resulted data are shown in Table 7.

EXAMPLES 73-78

The ceramic powders selected from group (a) were prepared as two kinds of raw powders of (a1) and (a2), and the ceramic powders selected from group (b) were prepared as one kind of raw powders of (b2) or two kinds of raw powders of (b1) and (b2). Y₂O₃ was added, and various third components were added. The mixture was sintered in a manner similar to that in Example 1. The conditions and the resulted data are shown in Table 8.

EXAMPLE 79

The mixing ratio of the ceramic powders selected from group (a) and the ceramic powders selected from group (b) was controlled in an inbalance ratio other than 1:1. The mixture was sintered in a manner similar to that in Example 1. The conditions and the resulted data are shown in Table 9.

TABLE 7

| | Raw powder | | | | | | Sintering conditions | | |
|---|---|---|---|---|---|---|---|---|---|
| | Raw powder (a) | TiO₂ powder (b) | | Y₂O₃ | | Third component | | | |
| No. | average particle size (μm) | average particle size (μm) | Mixing ratio (a:b) | Ave. size (μm) | Addition (mol %) | average size (μm), addition | Temp. (°C.) | Time (hr) | Pressure (MPa) |
| Ex. 54 | ZrB₂ 0.8 | 0.02 | 1:1 | 0.2 | 3 | Al₂O₃ 0.02, 10 vol % | 1650 | 1 | 20 |
| Ex. 55 | ZrB₂ 0.8 | 0.02 | 1:1 | 0.2 | 3 | Al₂O₃ 0.02, 20 vol % | 1650 | 1 | 20 |
| Ex. 56 | ZrB₂ 0.8 | 0.02 | 1:1 | 0.2 | 3 | Al₂O₃ 0.02, 30 vol % | 1650 | 1 | 20 |
| Ex. 57 | ZrB₂ 0.8 | 0.02 | 1:1 | 0.2 | 3 | Al₂O₃ 0.2, 10 vol % | 1650 | 1 | 20 |
| Ex. 58 | ZrB₂ 0.8 | 0.02 | 1:1 | 0.2 | 3 | Al₂O₃ 0.2, 20 vol % | 1650 | 1 | 20 |
| Ex. 59 | ZrB₂ 0.8 | 0.02 | 1:1 | 0.2 | 3 | Al₂O₃ 0.2, 30 vol % | 1650 | 1 | 20 |
| Ex. 60 | ZrB₂ 0.8 | 0.02 | 1:1 | 0.2 | 3 | SiC 0.2, 10 vol % | 1750 | 1 | 20 |
| Ex. 61 | ZrB₂ 0.8 | 0.02 | 1:1 | 0.2 | 3 | SiC 0.2, 20 vol % | 1750 | 1 | 20 |
| Ex. 62 | ZrB₂ 0.8 | 0.02 | 1:1 | 0.2 | 3 | SiC 0.2, 30 vol % | 1800 | 1 | 20 |
| Ex. 63 | ZrB₂ 0.8 | 0.02 | 1:1 | 0.2 | 3 | SiC whisker 0.3φ × 4L, 10 vol % | 1750 | 1 | 20 |
| Ex. 64 | ZrB₂ 0.8 | 0.02 | 1:1 | 0.2 | 3 | SiC whisker 0.3φ × 4L, 20 vol % | 1800 | 1 | 20 |

TABLE 7-continued

| | | | | | | | | | |
|---|---|---|---|---|---|---|---|---|---|
| Ex. 65 | ZrB$_2$ 0.8 | 0.02 | 1:1 | 0.2 | 3 | SiC whisker 0.3φ × 4L, 30 vol % | 1850 | 1 | 20 |
| Ex. 66 | ZrB$_2$ 0.8 | 0.02 | 1:1 | 0.2 | 3 | SiC whisker 1.4φ × 6L, 10 vol % | 1750 | 1 | 20 |
| Ex. 67 | ZrB$_2$ 0.8 | 0.02 | 1:1 | 0.2 | 3 | SiC whisker 1.4φ × 6L, 20 vol % | 1800 | 1 | 20 |
| Ex. 68 | ZrC 0.8 | 0.02 | 1:1 | 0.2 | 3 | Al$_2$O$_3$ 0.2, 10 vol % | 1650 | 1 | 20 |
| Ex. 69 | ZrC 0.8 | 0.02 | 1:1 | 0.2 | 3 | Al$_2$O$_3$ 0.2, 20 vol % | 1650 | 1 | 20 |
| Ex. 70 | ZrC 0.8 | 0.02 | 1:1 | 0.2 | 3 | Al$_2$O$_3$ 0.2, 30 vol % | 1650 | 1 | 20 |
| Ex. 71 | ZrC 0.8 | 0.02 | 1:1 | 0.2 | 3 | SiC 0.2, 10 vol % | 1750 | 1 | 20 |
| Ex. 72 | ZrC 0.8 | 0.02 | 1:1 | 0.2 | 3 | SiC whisker 1.4φ × 6L, 20 vol % | 1800 | 1 | 20 |

| | No. | Composition of sintered material and characteristics thereof | | | |
|---|---|---|---|---|---|
| | | Composition (Composition ratio) | Relative density | Bend strength (kg/mm$^2$) | Vickers hardness (kg/mm$^2$) | Fracture toughness (MPa · m$^{\frac{1}{2}}$) |
| | Ex. 54 | TiB$_2$/ZrO$_2$(t)/Al$_2$O$_3$ | 100 | 131 | 1850 | 6.8 |
| | Ex. 55 | TiB$_2$/ZrO$_2$(t)/Al$_2$O$_3$ | 100 | 125 | 1690 | 5.1 |
| | Ex. 56 | TiB$_2$/ZrO$_2$(t)/Al$_2$O$_3$ | 100 | 106 | 1510 | 4.7 |
| | Ex. 57 | TiB$_2$/ZrO$_2$(t)/Al$_2$O$_3$ | 99 | 119 | 1810 | 6.7 |
| | Ex. 58 | TiB$_2$/ZrO$_2$(t)/Al$_2$O$_3$ | 99 | 121 | 1570 | 4.9 |
| | Ex. 59 | TiB$_2$/ZrO$_2$(t)/Al$_2$O$_3$ | 99 | 91 | 1490 | 5.1 |
| | Ex. 60 | TiB$_2$/ZrO$_2$(t)/SiC | 99 | 115 | 1750 | 4.4 |
| | Ex. 61 | TiB$_2$/ZrO$_2$(t)/SiC | 99 | 98 | 1780 | 4.2 |
| | Ex. 62 | TiB$_2$/ZrO$_2$(t)/SiC | 99 | 86 | 1780 | 3.9 |
| | Ex. 63 | TiB$_2$/ZrO$_2$(t)/SiC | 99 | 125 | 1790 | 5.7 |
| | Ex. 64 | TiB$_2$/ZrO$_2$(t)/SiC | 99 | 133 | 1800 | 5.4 |
| | Ex. 65 | TiB$_2$/ZrO$_2$(t)/SiC | 98 | 102 | 1800 | 5.1 |
| | Ex. 66 | TiB$_2$/ZrO$_2$(t)/SiC | 99 | 133 | 1800 | 5.4 |
| | Ex. 67 | TiB$_2$/ZrO$_2$(t)/SiC | 98 | 102 | 1800 | 5.2 |
| | Ex. 68 | TiC/ZrO$_2$(t)/Al$_2$O$_3$ | 100 | 131 | 1850 | 6.8 |
| | Ex. 69 | TiC/ZrO$_2$(t)/Al$_2$O$_3$ | 100 | 125 | 1690 | 5.1 |
| | Ex. 70 | TiC/ZrO$_2$(t)/Al$_2$O$_3$ | 100 | 106 | 1510 | 4.7 |
| | Ex. 71 | TiC/ZrO$_2$(t)/SiC | 99 | 115 | 1750 | 4.4 |
| | Ex. 72 | TiC/ZrO$_2$(t)/SiC | 99 | 133 | 1800 | 5.4 |

TABLE 8

| | Raw powder | | | | | | | | Sintering conditions | | |
|---|---|---|---|---|---|---|---|---|---|---|---|
| No. | Raw powder (a1) average particle size (μm) | Raw powder (a2) average particle size (μm) | Raw powder (b1) average particle size (μm) | TiO$_2$ powder (b2) average particle size (μm) | Mixing ratio (a1:a2:b2) or (a1:a2:b1:b2) | Y$_2$O$_3$ Ave. size (μm) | Y$_2$O$_3$ Addition (mol %) | Third component average size (m), addition | Temp. (°C.) | Time (hr) | Pressure (MPa) |
| Ex. 73 | ZrB$_2$ 0.5 | ZrC 0.5 | — | 0.02 | 1:1:2 | 0.2 | 3 | Al$_2$O$_3$ 0.2, 20 vol % | 1650 | 1 | 20 |
| Ex. 74 | ZrB$_2$ 0.5 | ZrC 0.5 | — | 0.02 | 1:1:2 | 0.2 | 3 | Al$_2$O$_3$ 0.2, 20 vol % | 1600 | 1 | 20 |
| Ex. 75 | ZrB$_2$ 0.5 | ZrC 0.5 | — | 0.02 | 1:1:2 | 0.2 | 3 | SiC 0.2, 20 vol % | 1700 | 1 | 20 |
| Ex. 76 | ZrB$_2$ 0.5 | ZrC 0.5 | — | 0.02 | 1:1:2 | 0.2 | 3 | SiC whisker 1.4φ × 6L, 20 vol % | 1750 | 1 | 20 |
| Ex. 77 | ZrB$_2$ 0.5 | ZrC 0.5 | TiN 1.7 | 0.02 | 1:1:1:1 | 0.2 | 3 | Al$_2$O$_3$ 0.02, 20 vol % | 1800 | 1 | 20 |
| Ex. 78 | ZrB$_2$ 0.5 | ZrC 0.5 | TiN 2.0 | 0.02 | 1:1:1:1 | 0.2 | 3 | Al$_2$O$_3$ 0.02, 20 vol % | 1600 | 1 | 20 |

| | No. | Composition of sintered material and characteristics thereof | | | |
|---|---|---|---|---|---|
| | | Composition (Composition ratio) | Relative density | Bend strength (kg/mm$^2$) | Vickers hardness (kg/mm$^2$) | Fracture toughness (MPa · m$^{\frac{1}{2}}$) |
| | Ex. 73 | TiB$_2$/TiC/ ZrO$_2$(t)/Al$_2$O$_3$ | 99 | 127 | 1650 | 5.6 |
| | Ex. 74 | TiB$_2$/TiC/ ZrO$_2$(t)/Al$_2$O$_3$ | 99 | 118 | 1660 | 5.5 |

TABLE 8-continued

| | | | | | |
|---|---|---|---|---|---|
| Ex. 75 | TiB$_2$/TiC/ZrO$_2$(t)/SiC | 98 | 97 | 1580 | 4.9 |
| Ex. 76 | TiB$_2$/TiC/ZrO$_2$(t)/SiC | 98 | 106 | 1540 | 6.0 |
| Ex. 77 | TiB$_2$/TiC/ZrN/ZrO$_2$(t)/Al$_2$O$_3$ | 99 | 87 | 1340 | 6.8 |
| Ex. 78 | TiB$_2$/TiC/ZrC/ZrO$_2$(t)/Al$_2$O$_3$ | 99 | 76 | 1440 | 6.4 |

TABLE 9

| | Raw powder | | | | | | | | | Sintering conditions | | |
|---|---|---|---|---|---|---|---|---|---|---|---|---|
| | Raw powder (a1) average particle size (μm) | Raw powder (a2) average particle size (μm) | Raw powder (b1) average particle size (μm) | TiO$_2$ powder (b2) average particle size (μm) | Mixing ratio (a1:a2:b2) or (a1:a2:b1:b2) | Y$_2$O$_3$ Ave. size (μm) | Y$_2$O$_3$ Addition (mol %) | Third component average size (m), addition | | Temp. (°C.) | Time (hr) | Pressure (MPa) |
| No. | | | | | | | | | | | | |
| Ex. 79 | ZrB$_2$ 0.5 | TiN 0.5 | TiC 2.0 | 0.02 | 3:1:1:1 | 0.2 | 3 | SiC whisker 1.4φ × 6L, 20 vol % | | 1750 | 1 | 20 |

| | Composition of sintered material and characteristics thereof | | | | |
|---|---|---|---|---|---|
| No. | Composition (Composition ratio) | Relative density | Bend strength (kg/mm$^2$) | Vickers hardness (kg/mm$^2$) | Fracture toughness (MPa · m$^{\frac{1}{2}}$) |
| Ex. 79 | TiB$_2$/ZrC/ZrN/ZrO$_2$(t) | 98 | 86 | 1520 | 5.9 |

Although several preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included within the scope of the invention as defined by the following claims.

What is claimed is:

1. A process for producing a ceramic composite comprising the steps of:

mixing at least one ceramic powder consisting of a compound selected from group (a) and at least one ceramic powder consisting of a compound selected from group (b), (a) = ZrB$_2$, HfB$_2$, ZrC, HfC, ZrN, HfN,
   (b) = TiC, TiN, TiO$_2$;

sintering the mixture in a non-oxidizing atmosphere causing a substitution reaction of the chemical elements of the group (a) compounds and the group (b) compounds to occur; and forming a ceramic composite comprising at least two compounds selected from group (a') and group (b'), respectively, (a') = Ti$_2$, TiC, TiN, (b') = ZrC, ZrN, ZrO$_2$, HfC, HfN, HfO$_2$, said compounds of groups (a') and (b') being made by substituting Zr or Hf from the compounds of group (a) for Ti of the compounds of group (b).

2. The process according to claim 1, wherein said mixture is sintered after being formed.

3. The process according to claim 1, wherein said mixture is sintered and pressed.

4. The process according to claim 3, wherein said mixture is sintered by hot pressing.

5. The process according to claim 1, wherein said non-oxidizing atmosphere is an inert atmosphere.

6. The process according to claim 5, wherein said inert atmosphere is formed by argon gas.

7. The process according to claim 1, wherein said non-oxidizing atmosphere is formed by reducing the pressure of the atmosphere to a vacuum of not greater than 0.1 Torr.

8. The process according to claim 1, wherein the mixing mole ratio of said ceramic powders consisting of the compounds of group (a) and the compounds of group (b) is in the range of from 1:0.2 to 1:2.0.

9. The process according to claim 1, wherein said ceramic powders are mixed by wet blending.

10. The process according to claim 9, wherein said ceramic powders are mixed by wet blending using an organic solvent.

11. The process according to claim 1, wherein a stabilizer is added to said mixture.

12. The process according to claim 11, wherein said stabilizer is at least one compound selected from the group consisting of Y$_2$O$_3$, CeO$_2$, MgO and CaO.

13. The process according to claim 1, wherein the particle size of said ceramic powders consisting of the compounds of groups (a) and (b) is not greater than 5.0 μm.

14. The process according to claim 1, wherein said mixture is sintered at a temperature of 1000°–1900° C.

15. The process according to claim 1, wherein said mixture is heated to the sintering temperature at a rate of 5°–10° C./min.

16. The process according to claim 3, wherein said mixture is sintered by heating the mixture to the sintering temperature and then maintaining the mixture at this temperature for 0.5–2 hours.

17. The process according to claim 1, wherein a third component which is substantially irrelevant to said substitution reaction is added to said mixture.

18. The process according to claim 17, wherein said third component is at least one component selected from the group consisting of $SiO_2$, MgO, $Al_2O_3$, $Al_6Si_2O_{13}$, CaO, $ZrO_2$, $HfO_2$, WC, SiC, TiC, ZrC, HfC, TaC, NbC, $B_4C$, TiN, ZrN, AlN, $Si_3N_4$, HfN, TaN, cubic BN, WB, $TiB_2$, $HfB_2$, Si, Mg, Ca, Al, Ti, Zr, Hf, Ta, W, Ni, Co, Mo and Fe.

19. The process according to claim 18, wherein said third component is added in an amount not greater than 40% by volume.

20. The process according to claim 17, wherein said third component is at least one member selected from the group consisting of Sic whiskers, $B_4C$ whiskers and $Si_3N_4$ whiskers.

21. The process according to claim 20, wherein said whiskers are added in an amount of 5–40% by volume.

22. A ceramic composite produced by a process comprising the steps of:
  mixing at least one ceramic powder consisting of a compound selected from group (a) and at least one ceramic powder consisting of a compound selected from group (b),
  (a) = $ZrB_2$, $HfB_2$, ZrC, HfC, ZrN, HfN,
  (b) = TiC, TiN, $TiO_2$;
  sintering the mixture in a non-oxidizing atmosphere causing a substitution reaction of the chemical elements of the group (a) compounds and the group (b) compounds to occur; and
  forming a ceramic composite substantially comprising compounds which do not belong to the group (a) or group (b) compounds as a result of said substitution reaction.

* * * * *